United States Patent Office 3,575,921
Patented Apr. 20, 1971

---

3,575,921
ORGANOSILOXANE POLYMERS
Chi-long Lee, Midland, Mich., assignor to Dow Corning Corporation, Midland, Mich.
No Drawing. Filed Dec. 18, 1968, Ser. No. 784,876
Int. Cl. C08f *11/04*
U.S. Cl. 260—46.5
6 Claims

ABSTRACT OF THE DISCLOSURE

Linear organosiloxane polymers containing fluorinated alkyl substituents, for example

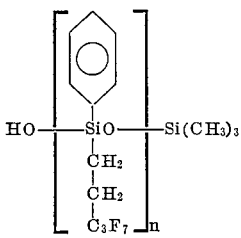

are disclosed.

The polymers are useful as lubricants.

---

This invention relates to organosiloxane polymers which contain phenyl and fluorinated alkyl substituents bonded to the silicon atom. In one aspect, the invention relates to a novel solid lubricant. In another aspect, the invention relates to polysiloxane fluid lubricant.

Siloxane polymers which contain both fluorinated alkyl and alkyl substituents on the silicon atom are known. One such polymer is polytrifluoropropylmethylsiloxane. This siloxane is a fluid having good temperature stability. The fluid is an excellent lubricant. One limitation on the use of these materials is that only the fluid and gum forms can be produced. Solid polymers are not available. The known polymers also have a wide molecular weight distribution, which necessitates extraction of a large amount of low molecular species before the material can be used in certain applications.

By the practice of the invention, there is provided a polysiloxane containing fluorinated alkyl and phenyl, as opposed to alkyl, substituents. In contrast to known fluorinated alkyl-siloxanes, this homopolymer has a very narrow molecular weight distribution and can be produced as a solid.

It is an object of the invention to provide novel siloxane homopolymers.

Another object of the invention is to provide a solid lubricant having good thermal stability.

These and other objects of the invention will be apparent upon consideration of the following disclosure.

According to the invention, there is provided a linear siloxane polymer consisting essentially of units of the formula

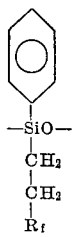

in which $R_f$ is a perfluoroalkyl radical of from 1 to 10 carbon atoms inclusive.

The $R_f$ substituent in the above-described homopolymer can be —$CF_3$, —$C_2F_5$, —$C_3F_7$ and so on, through to the $C_9F_{19}$ and $C_{10}F_{21}$ radicals. The perfluoroalkyl groups can be straight or branched-chain structures.

These homopolymers are characterized as having a very narrow molecular weight distribution. They can be fluids, gums or solids depending upon the degree of polymerization. Those polymers containing at least about 150 of the above-defined siloxane units are semicrystalline solids and in certain instances, as shown in the examples, can have stereo specific structure. The polymer is readily soluble in aromatic solvents such as benzene, toluene and xylene.

The siloxane polymers of the invention are prepared by polymerization of the corresponding cyclic trimer in the presence of lithium catalyst, such as n-butyl lithium or other alkaline catalysts, for example an alkali metal hydroxide, quaternary ammonium salts of such hydroxides or the alkali metal salt of a siloxane. The polymerization proceeds at temperatures of 100° C. and above. The preparation and isolation of the cyclic trimer precursors is described in the copending application of G. W. Holbrook, Ser. No. 784,875, filed simultaneously herewith.

The lithium catalyst can be inactivated by the addition of a weak acid, such as acetic acid, to the reaction. The degree of polymerization or molecular weight of the product is controlled by the ratio of catalyst to trimer, the less catalyst added, the higher the molecular weight of the polymer.

The following examples are illustrative of the invention which is properly delineated in the appended claims.

EXAMPLE 1

Four hundred grams of cyclic $$[(CF_3CH_2CH_2)(C_6H_5)SiO]_3$$

were introduced into a one-liter flask which had been purged with dry nitrogen.

The trimer was a mixture of the cis-isomer,

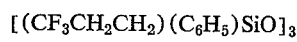
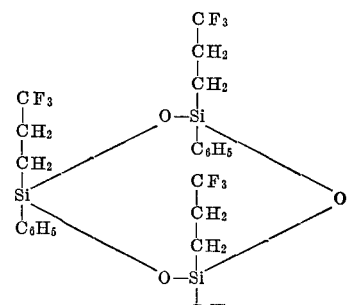

and the trans-isomer,

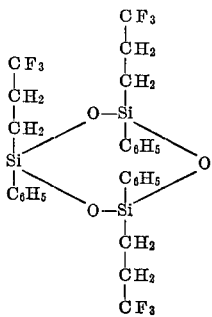

The trans-isomer content of the mixture was about twice that of cis-isomer content.

Four milliliters of n-butyl lithium in heptane (1.1 mole of n-butyl lithium/liter) was added to the trimer. The catalyst-containing trimer was then heated to a temperature of 150° C. and stirred vigorously. After four minutes, polymerization was complete. The product was a solid polymer of the general formula

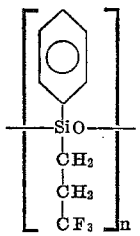

and had a number average molecular weight ($M_n$) of about 100,000 as determined by gel permeation chromatography.

EXAMPLE 2

One hundred-nine grams of the cyclic trimer utilized in Example 1 were heated to 150° C. and polymerized by the addition of one milliliter of the above-described n-butyl lithium solution. After 2 minutes the reaction was complete, yielding a solid polymer

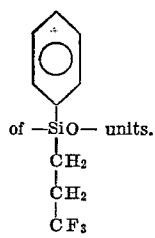

of —SiO— units.

The product was dissolved in toluene and then precipitated with acetic acid to yield

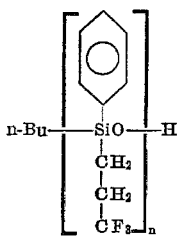

$n$ being approximately 270.

The precipitated polymer was vacuum dried at 60° C. to remove the solvent. The number average molecular weight ($M_n$) was about 60,000, while the weight average molecular weight ($M_w$) was determined to 70,000. Thus the heterogeneity ratio is 1.18, a very narrow molecular weight distribution in the polymer product.

A sample of the product was tested to determine its thermal stability by maintaining the material at 450° F. and measuring weight loss at specific time intervals. Results are as follows:

| Time maintained at 450° F., days: | Percent weight loss |
|---|---|
| 3 | 0.39 |
| 7 | 0.66 |
| 14 | 0.92 |

These results demonstrate the superior thermal stability of the polymers of the invention.

EXAMPLE 3

Twenty grams of the cyclic trimer utilized in Example 1 were heated to 150° C. and polymerized by the addition of 0.75 milliliter of the previously described n-butyl lithium solution. The trimer polymerized to a high viscosity fluid after 2 minutes.

The number average ($M_n$) molecular weight was determined to be 18,800; the weight average molecular weight $M_w$ was 22,200. The heterogeneity ratio, $M_w/M_n$, of 1.18 shows that this polymer also has a very narrow molecular weight distribution.

EXAMPLE 4

To demonstrate the effect of water addition to the polymerization, 50 grams of the cyclic trimer utilized in Example 1 were polymerized by the addition of 1 milliliter of the previously described n-butyl lithium solution and 0.1 milliliter of distilled water. This polymerization was complete in 2 minutes to yield an oily fluid polymer of the formula

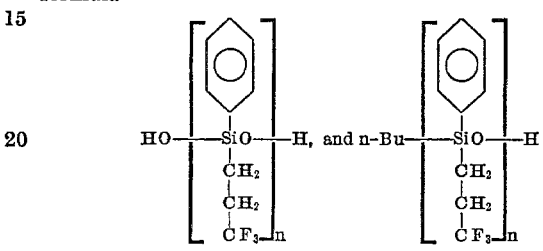

where $n$ was equal to about 32. The product had a number average molecular weight of 7,000 and a weight average molecular weight of 9,800. The $M_w/M_n$ ratio was 1.40 thus the addition of water not only lowers the molecular weight, but also broadens the molecular weight distribution of the polymer.

The $M_w/M_n$ ratio for known polytrifluoropropylmethylsiloxane is approximately 4. As shown by the above examples, the homopolymers of the invention generally have a heterogeneity ratio of less than 2, even when water is added during polymerization.

EXAMPLE 5

Thirty grams of the cyclic trimer utilized in Example 1 were mixed with 0.0045 gram of $(CH_3)_3SiONa$ in an open vessel. The mixture was heated to 125° C. After a few hours, a gummy polymer of phenyltrifluoropropyl siloxane precipitated while the unreacted cyclic trimer remained in the upper liquid layer. The polymer gum thus obtained had a melt viscosity of 213,000 cs.

EXAMPLE 6

Eighteen grams of the cyclic trimer utilized in Example 1 were mixed with 0.002 gram of $(CH_3)_3SiONa$ in a lead tube. The air in the tube was removed and the tube was sealed. The sealed tube was placed in a steel bank into which mineral oil was pumped to create an initial pressure of 20,000 p.s.i. The bomb was then heated to give an internal pressure of 37,000 p.s.i. These conditions were maintained for 2 days.

The polymer thus prepared had a melt viscosity of 821,340 cs.

EXAMPLE 7

When 100 grams of cyclic

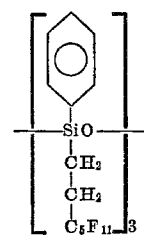

are mixed with 4 grams of the previously-described n-butyl lithium catalyst and heated to about 150° C. a solid polymer of

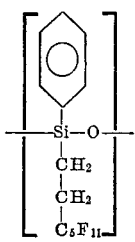

units is obtained.

EXAMPLE 8

The cis- and trans-isomers of the cyclic trimer of polytrifluoropropylphenylsiloxane were separated by a solvent extraction technique. The isomeric mixture of trimers was dissolved in n-pentane. The pentane solution was then extracted with acetonitrile. A low melting isomeric form was isolated by evaporating the solvent from the pentane phase. To separate the higher melting isomeric form, the acetonitrile phase was extracted with pentane and the solvent then evaporated. Upon standing for a long period of time a crystal product precipitated. The crystals were identified as pure cis-isomer by $F^{19}$ n.m.r. spectroscopy. The melting points of the two isomers were determined by using a polarized microscope provided with a heated stage. The melting points of cis- and trans-isomers were found to be 68° and 37.5° C., respectively.

Four grams of the pure cis-isomer were introduced into a test tube which had been purged with dry nitrogen. Five microliters of sec-butyl lithium were added and the mixture was heated to 150° C. After five minutes at 150° C., a hard elastomeric polymer was obtained. The polymerization was terminated by cooling the product with Dry Ice and then dissolving the product in toluene which contained a small quantity of acetic acid. The polymer was precipitated from the solution by addition of methanol. The precipitated polymer was dried at room temperature under a high vacuum.

The polymer was a stereospecific material of the following structure:

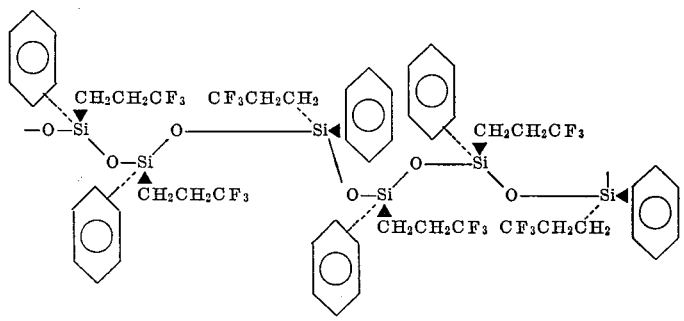

The above depicted character of this stereospecific polymer was identified by $F^{19}$ NMR.

EXAMPLE 9

To demonstrate the suitability of the linear homopolymers of the invention as solid lubricants, the polymers prepared in Examples 1 through 4 were each dissolved in toluene and coated onto a 0.751±.0001 inch-diameter, 2 inch long steel plug. Evaporation of the toluene left a coating of the polymer on the steel plug. This coating was a few microns thick. The coated plug was then forced into an annular sleeve which had an internal diameter of 0.750±.0001 inch. The percent of entry of the plug length into the sleeve was measured at various loadings. Of course, the greater the entry and the smaller the load to obtain entry, the better the solid lubricant. The coefficient of friction was also measured for the polymer of Example 1. This test is described in detail in ASTM-TCL-1-2.

For purposes of comparison, graphite, a known solid lubricant, was also tested in the manner described above. Results are set forth below:

| Solid lubricant | Percent entry | Load (lbs.) | Coefficient of friction |
| --- | --- | --- | --- |
| Polymer of Example 1 | 100 | 5,750 | 0.12 |
| Polymer of Example 2 | 100 | 5,700 | |
| Polymer of Example 3 | 100 | 9,100 | |
| Polymer of Example 4 | 100 | 9,300 | |
| Graphite | 32 | 15,000 | Fail |

These results demonstrate that the polymers of the invention are highly effective solid lubricants. The material can be used to impregnate porous bearings, deposited as a dry film on bearing surfaces or it can be bonded to other materials to form a bearing composite.

Included with the scope of the invention is a method of lubricating moving metallic parts comprising maintaining therebetween a film of the polymer of the invention. Other reasonable modifications and variations are within the scope of the invention which is directed to a linear siloxane polymer and uses thereof.

That which is claimed is:

1. A linear siloxane polymer consisting essentially of units of the formula

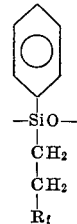

in which $R_f$ is a perfluoroalkyl radical of from 1 to 10 carbon atoms inclusive.

2. The siloxane of claim 1 wherein $R_f$ is a trifluoromethyl radical.

3. The siloxane of claim 1 which consists of at least 150 of said units, further characterized as a semicrystalline solid.

4. The siloxane of claim 1 further characterized as having a heterogeneity ratio of less than 2.

5. A solid lubricant consisting essentially of a linear siloxane polymer of units of the formula

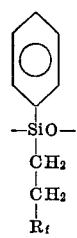

in which $R_f$ is a perfluoroalkyl radical of from 1 to 10 carbon atoms inclusive.

6. The lubricant of claim 5 wherein $R_f$ is a trifluoromethyl radical.

References Cited

UNITED STATES PATENTS

| | | | |
|---|---|---|---|
| 3,179,619 | 4/1965 | Brown | 260—37 |
| 3,274,154 | 9/1966 | Kendrick et al. | 260—46.5 |
| 3,294,740 | 12/1966 | McVannel | 260—46.5 |
| 3,373,138 | 3/1968 | Brown | 260—46.5 |
| 3,445,426 | 5/1969 | Lee | 260—46.5 |
| 3,481,898 | 12/1969 | Davies | 260—46.5 |
| 3,503,926 | 3/1970 | Saylor | 260—46.5 |

DONALD E. CZAJA, Primary Examiner

M. I. MARQUIS, Assistant Examiner

U.S. Cl. X.R.

117—127; 252—49.6; 260—448.2